United States Patent [19]

Bayshore

[11] Patent Number: 4,573,775
[45] Date of Patent: Mar. 4, 1986

[54] BIFOCAL CONTACT LENS

[75] Inventor: Charles A. Bayshore, Orlando, Fla.

[73] Assignee: Vistakon, Inc., Jacksonville, Fla.

[21] Appl. No.: 409,467

[22] Filed: Aug. 19, 1982

[51] Int. Cl.⁴ .......................... G02C 7/04; G02C 7/06
[52] U.S. Cl. ................................................. 351/161
[58] Field of Search .............. 351/160 R, 160 H, 161, 351/162

[56] References Cited

U.S. PATENT DOCUMENTS

| D. 191,140 | 8/1961 | Gates et al. | D57/1 |
| D. 191,964 | 12/1961 | Gates et al. | D57/1 |
| D. 203,357 | 12/1965 | Adler | D57/1 |
| D. 205,046 | 6/1966 | Adler | D57/1 |
| D. 206,190 | 11/1966 | Adler | D57/1 |
| 3,212,097 | 10/1965 | Adler | 351/160 R |
| 3,431,327 | 3/1969 | Tsuetaki | 264/1 |
| 3,597,055 | 8/1971 | Neefe | 351/161 |
| 3,794,414 | 2/1974 | Wesley | 351/161 |
| 4,095,878 | 6/1968 | Fanti | 351/161 |

FOREIGN PATENT DOCUMENTS

| 496583 | 10/1953 | Canada | 351/160 R |
| 721045 | 11/1965 | Canada | 351/160 R |
| 1206620 | 12/1965 | Fed. Rep. of Germany | 351/161 |
| 895334 | 5/1962 | United Kingdom | 351/161 |

OTHER PUBLICATIONS

Ultracon (advertisement); "Contacto"; vol. 3, No. 11, Nov. 1959, p. 361.
"Review of Optometry" (Nov., 1981), Bausch & Lomb advertisement re Bifocal Soft Contact Lenses.
*The Star Ledger*, Newark, New Jersey (Jun. 22, 1982). Wesley-Jessen advertisement re Durasoft Bifocal Lenses, circa Nov., 1981.
"The Tricon Bifocal" (Mar., 1961).
Advanced Contact Lens Fitting, vol. 1(6), p. 15, (Oct., 1959).
"The Ulticon Prism Bifocal", The Optician, vol. 140(3636), pp. 549–551 (Dec. 19, 1960).
The Optometric Weekly, vol. 51(8), p. 374 (Feb. 25, 1960).

Primary Examiner—John K. Corbin
Assistant Examiner—Scott J. Sugarman
Attorney, Agent, or Firm—Wayne R. Eberhardt

[57] ABSTRACT

A soft, multifocal contact lens of the segmented type intended to translate vertically between the near-vision and distance-vision modes, characterized in that the superior portion of the lens is equiangularly truncated from points on either side of the vertical axis at the apex of the lens to points on each respective side proximal the horizontal axis of the lens.

27 Claims, 20 Drawing Figures

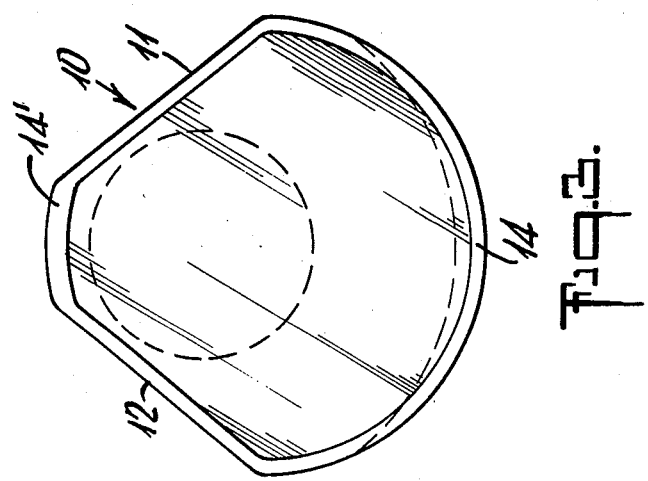
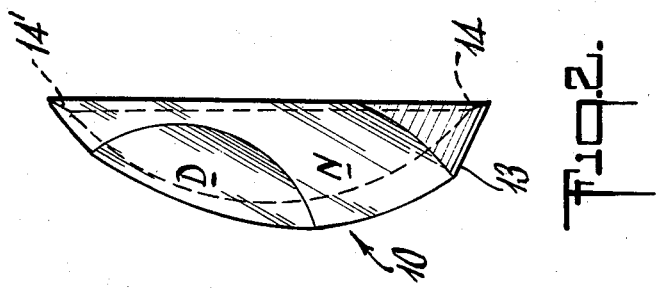
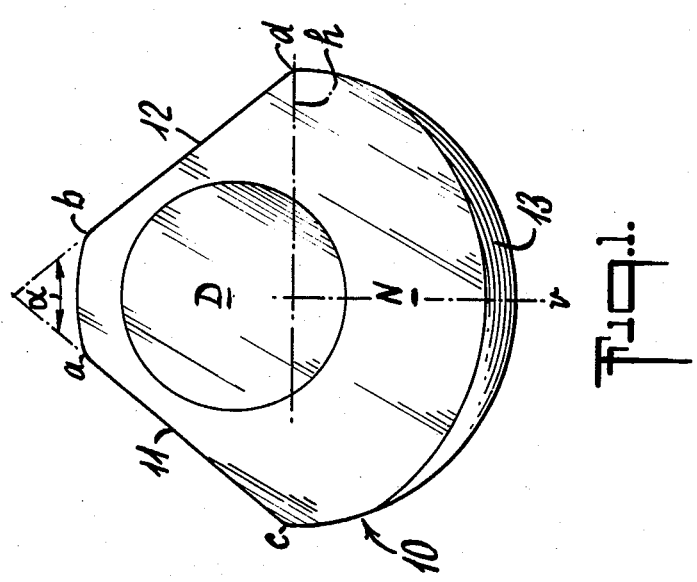

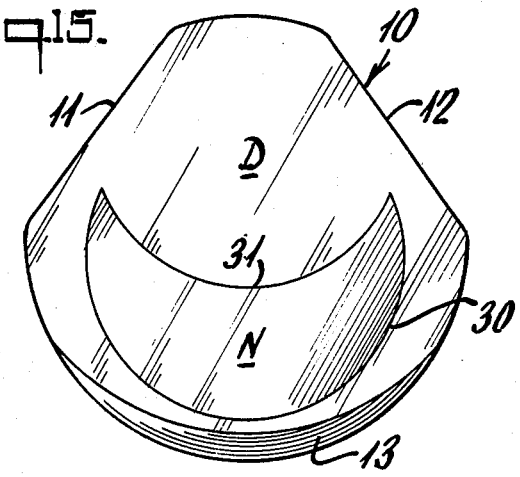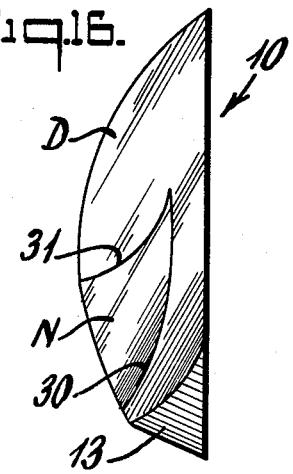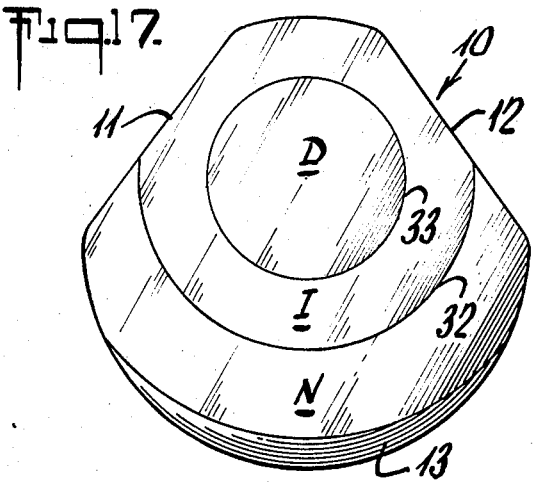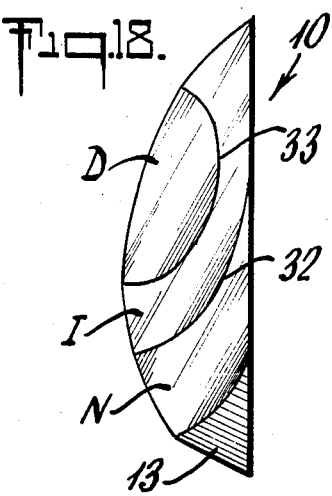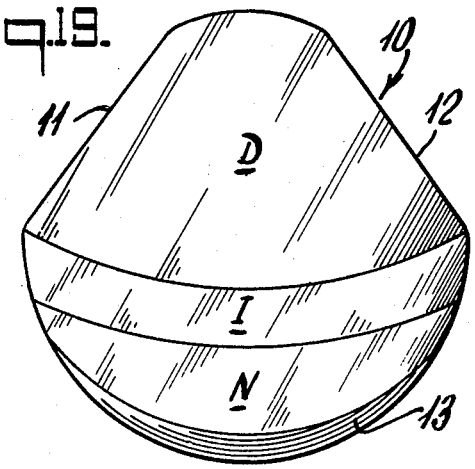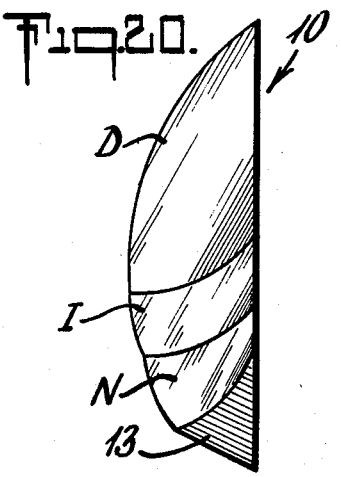

BIFOCAL CONTACT LENS

FIELD OF THE INVENTION

This invention relates to soft contact lenses, and, more particularly, to multifocal, soft contact lenses having specific areas for distance and near-vision correction and adapted to translate in a controlled vertical movement between the distance vision mode and the near vision mode.

BACKGROUND OF THE INVENTION

Multifocal contact lenses of the hard type have been available for a number of years, while soft multifocal lenses have been under investigation and development. Multifocal contact lenses, most usually bifocal lenses, are designed to correct presbyopia, a condition which develops with advancing age and causes the eye to lose its ability to focus at near distances such as the normal reading distance. Contact lenses designed to correct presbyopia are generally of two types designated as concentric and nonconcentric or segmented.

The concentric contact lens is characterized in that a material having a different refractive index than that of the principle material surrounds the geometric center of the lens in a generally concentric ring. Alternatively, a portion of the lens may be ground to a shorter focal length in a generally concentric pattern relative to the geometric center of the lens. The concentric contact lens is intended to remain centered on the cornea at all times. Distance vision is obtained through the center portion of the lens which may have a diameter of from 1 to about 4 mm. Near vision is obtained through the peripheral concentric portion of the lens. While a portion of the actual perceived image is always out of focus in such a bifocal lens, the user is generally able to mentally reject the out-of-focus portion of the image in favor of the in-focus portion.

The nonconcentric or segmented contact lens is generally characterized in that the near vision element having a different refractive index or ground to provide a shorter focal length, generally referred to as the bifocal segment of the lens, is located in the lower sector or portion of the lens away from the geometric center which comprises the distance vision portion of the lens. Most segmented contact lenses are intended to translate, i.e., move vertically relative to the pupil of, the eye when shifting between the distance vision mode and the near vision mode. Such lenses have an advantage in providing a greater proportion of in-focus image at both far and near distances, but have a disadvantage in that the lens must be designed for controlled translation and for maintaining translation and orientation during use.

Segmented bifocal lenses and other contact lenses which require a predetermined orientation on the eye, such as the toric lens which is intended to correct astigmatism, have commonly utilized two basic techniques to assure correct orientation. The lens may be provided with a base-down prism to increase the mass of the lower portion of the lens and create a weighting effect to orient the lens. The lens may also be provided with horizontal truncation or beveling along the lower and/or upper edges so that the combination of eyelid forces and scleral shaping effectively prevent the lens from rotating on the cornea.

It is an object of the present invention to provide a segmented, soft, multifocal contact lens of improved design. It is a further object to provide a soft, multifocal contact lens which is readily translated by the user in a controlled, vertical direction so that the pupil of the eye is presented with differing optical portions of the lens for distance vision and near vision. A still further object is to provide a multifocal contact lens which maintains its orientation and translation during normal use. It is a yet further object of this invention to provide a soft bifocal contact lens wherein the pupil of the eye is presented with a single, optical portion of the lens over at least 65% of its area in both near and distance visual modes.

SUMMARY

The multifocal contact lens of the present invention comprises a lens body of a conventional soft contact lens composition, having a generally spherical concave inner surface adapted to fit the cornea of an eye, a generally convex outer surface, and at least two optical zones having different focal lengths. The upper half of the lens is equiangularly truncated to provide a lens apex having a width of from about 2 to 8 mm, with the truncations extending to about the horizontal axis of the lens. An optical zone for distance vision is provided with at least a major portion thereof included within the upper half of the lens, while the lower half of the lens includes an optical zone of shorter focal length for near vision.

Truncation of the upper portion of the lens lowers the center of gravity of the lens and acts to stabilize the lens in its correct vertical orientation. Further ballast may be provided in the form of lens prism or an included weight near the lower edge of the lens to assure correct vertical orientation. In the case of a prism lens, the lower edge of the lens is beveled or otherwise contoured to control edge angle and to provide a surface which assists in effecting lens translation during use.

Lenses of the present invention are characterized by the ability to translate vertically up to 4 mm or more when the wearer shifts between far vision and near vision. This high degree of translation ability results primarily from the equiangular truncation of the upper half of the lens which reduces the forces normally acting to maintain centration of a soft contact lens on the cornea. Additionally, the truncated portion of the lens responds to the movement of the upper eyelid in a manner which assists in the vertical movement of the lens while simultaneously counteracting the usual tendency of a soft contact lens to rotate when displaced from a central position on the cornea.

The ability of the lens to translate vertically may be further enhanced by special treatment of the perimeter of the lens wherein the apex portion of the lens between the areas of truncation is provided with an edge on the ocular surface having a greater radius of curvature than the lower half portion of the lens to reduce angular contact of the apex portion against the sclera during vertical translation.

In a further embodiment, the upper portion of the lens is provided with a horizontal area of reduced thickness such as a surface channel in the area of truncation above the distance vision optical zone. The effect of this modification is to provide hinge-like means by which the apex portion of the lens is allowed to flex during vertical translation and thereby further reduce resistance to such translation.

The unique, equiangularly truncated lenses of the present invention may be bifocal or higher multifocal, and may assume a variety of configurations in optical zone placement, the only requirement being that a major portion of the distance vision zone is in the superior portion of the lens, and a major portion of the near vision zone is in the inferior portion of the lens.

DESCRIPTION OF DRAWINGS

FIG. 1 is a plan front view of a bifocal contact lens in accordance with the present invention.

FIG. 2 is a side view of the lens of FIG. 1.

FIG. 3 is a plan rear view of the lens of FIG. 1.

FIG. 15 is a front plan view of an alternative embodiment of a bifocal lens in accordance with the present invention.

FIG. 16 is a side view of the lens of FIG. 15.

FIG. 17 is a front plan view of a trifocal contact lens in accordance with the present invention.

FIG. 18 is a side view of the lens of FIG. 17.

FIG. 19 is a front plan view of another embodiment of a trifocal contact lens in accordance with the present invention.

FIG. 20 is a side view of the lens of FIG. 19.

DESCRIPTION OF PREFERRED EMBODIMENTS

Figure 4:
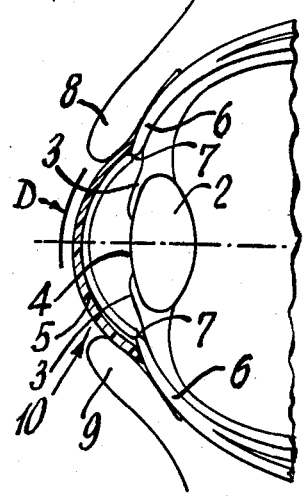
FIG. 4 is an enlarged view of a vertical section of the human eye illustrating the location of a contact lens of the present invention in the distance vision mode.

Referring now more particularly to the drawings, FIG. 1 illustrates a bifocal contact lens 10 truncated at 11 and 12 in accordance with the present invention. The lens is illustrated in the normal vertical orientation which it would assume during use. Horizontal axis (h) and vertical axis (v) pass through the geometric center of the lens.

In the illustrated embodiment, the individual optical zones are presented as distinct areas for clarity of illustration and understanding, it being understood that in actual practice, one optical zone may be blended into another and the lines of distinction minimized or eliminated.

In FIG. 1, the distance vision optical zone of the lens is identified as D while the near vision zone is designated as N. The optical center of the concave inner surface of the lens is conventionally at the geometric center of the lens. The optical center of zone D is located in the superior portion of the lens, preferably on the vertical axis and from about 0.5 to 2 mm above the geometric center of the lens. The optical center of zone N may be coincident with the optical center of zone D, or located inferior thereto, preferably also on the vertical axis of the lens. In lenses of higher powers, the optical center of zone N is preferably located at or below the geometric center of the lens in order to reduce the inferior thickness of the lens.

Optical zone D is located so that the inferior edge of the zone is at the bifocal height of the lens which may be at the geometric center or up to about 4 mm below geometric center. In this manner, optical zone D is positioned so that all or at least a major portion of the zone is included in the superior portion of the lens above the horizontal axis. The major portion of the near vision optical zone N is located in the inferior portion of the lens below the horizontal axis, but may extend into the superior portion of the lens surrounding zone D as an option of manufacturing convenience.

The diameter of the lens of FIG. 1 as measured along the vertical axis is preferably from 12.0 to 16.0 mm, with 14.0 to 15.0 mm being particularly preferred. The diameter of optical zone D may be from 2 to 10 mm, and is most preferably from 4 to 8 mm. The width of the apex of the lens as measured from point (a) to point (b) of FIG. 1 is preferably from about 2 to 8 mm, and most preferably from 3 to 5 mm. The truncation of the lens at 11 and 12 extends substantially over the two upper quadrants of the lens from points (a) and (b) to points (c) and (d) respectively which are at or near the horizontal axis of the lens. While the truncation at 11 and 12 is preferably chordal and sharply intersecting with the circle defining the circumference of the lens, it is permissible for the truncation to be slightly concave or convex if desired. The included angle of truncation α may be from about 45 to 120 degrees, and is most preferably from about 65 to 80 degrees.

In the specific lens illustrated in FIG. 1, optical zone D has a diameter of 7 mm and an optical center located on the vertical axis 2 mm above the geometric center of the lens. The inferior edge of zone D which defines the bifocal height of the lens is accordingly 1.5 mm below geometric center. The optical center of zone N is coincident with that of zone D. The width of the apex of the lens is 4 mm, the diameter of the lens is 15 mm, and the included angle of truncation is approximately 73 degrees.

It will be readily appreciated that substantially equiangular truncation of the superior portion of the lens provides the lens with a center of gravity which is located on the vertical axis some distance below the geometric center of the lens, and the lens will accordingly seek the proper vertical orientation during use as illustrated in FIG. 1. The lens of FIG. 1, however, also includes a base-down prism as best seen in cross section in FIG. 2 to further lower the center of gravity and stabilize the lens against rotation on the cornea. The lower edge of the lens includes a beveled or otherwise shaped area 13 which controls the angle and thickness of the edge and improves the comfort and performance of the lens.

The concave or inner surface of the lens of FIG. 1 is generally spherical to conform to the curvature of the cornea, and includes peripheral ocular surface 14 as best seen in FIG. 2 and FIG. 3 which conforms generally to the curvature of the sclera. As used herein, the term "generally spherical" is intended to encompass all naturally occurring curvatures of the cornea and accordingly includes aspherical and toric curvatures to the extent such may occur in the human cornea. Surface 14' over the apex of the lens is preferably formed with a slightly flatter radius than the curvature of the sclera and with a greater width than the corresponding surface 14 over the lower portion of the lens. Specifically, surface 14' has a preferred width of from about 0.5 to 1.2 mm, while corresponding surface 14 over the remainder of the lens has a preferred width of from about 0.3 to 0.7 mm.

The performance during use and the function of the physical features of the above described lens of FIG. 1 will now be described with reference to FIGS. 4 and 5 which illustrate the position of the lens on the cornea during use. FIG. 4 illustrates the position of the lens in the distance vision mode, while FIG. 5 illustrates the position of the lens in the reading or near vision mode.

Figure 5:
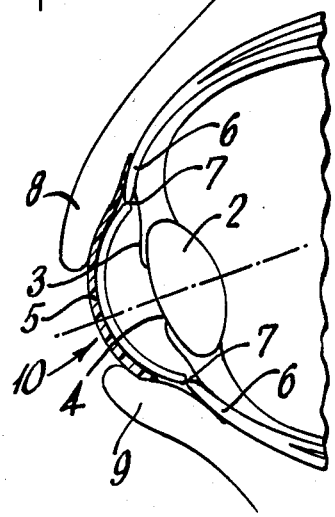
FIG. 5 is an enlarged view of a vertical section of the human eye illustrating the location of a contact lens of the present invention in the near vision mode.

With reference to the anatomy of the human eye, there is illustrated in FIG. 4 and FIG. 5 lens 2 of the eye which in normal use adjusts to variable focal lengths as required for near and distance vision. Over lens 2 is disposed iris 3, the contractile aperature of which defines pupil 4 and controls the amount of light entering through the lens. The cornea 5 forms a transparent and generally spherical convex outside surface of the light transmitting portion of the eye. The cornea is adjoined by sclera 6, the white portion of the eye, and the border between the cornea and the sclera constitutes limbus 7. Exterior of the eye are illustrated upper lid 8 and lower lid 9.

Figure 6:
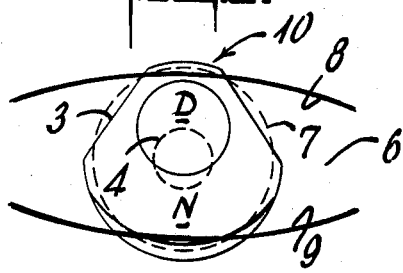
FIG. 6 is a plan front view of the eye and contact lens of FIG. 4.

Referring now to FIG. 4, contact lens 10 is seen to be centered on cornea 5 in the distance vision mode as would be a conventional monofocal lens. Since the optical center of zone D is located above the geometric center of the lens, pupil 4 is centered vertically lower than optical zone D as more clearly illustrated in FIG. 6. Nevertheless, the relative areas of optical zone D and pupil 4 are such that at least 65% of the pupil area is covered by optical zone D as required for sharp focal perception.

To translate from the distance vision mode of FIG. 4 to the near vision mode of FIG. 5, it is necessary for the lens to move vertically upward on the eye a distance of at least 2 mm, and preferably about 4 mm. This is accomplished by the wearer with deliberate eye movements basically as follows: while looking straight forward, the eyes are closed momentarily. Bells phenomenon causes the eyes to roll upward carrying the lower edge of the lens which remains centered on the cornea beyond the juncture of the upper and lower lids. The wearer then consciously directs the eyes downward and opens the eyes while maintaining the downward gaze. As the eyes are directed downward while the lids are closed, the action of the lower lid on the beveled portion 13 of the lens acts to move the lens upward on the cornea. As the eyes are opened, the edge of the upper lid further acts on beveled portion 13 to exert an upward force. Finally, the movement of the upper lid over the outer surface of the lens serves further to draw the lens in an upward direction.

In a conventional, circular soft contact lens, the upward directing forces of the upper and lower lids which tend to decenter the lens are opposed by the forces of circumferential tension which exist around the perimeter of the lens due to the fit of the lens over the cornea and onto the sclera and the surface tension of tears under the lens. These forces of circumferential tension are generally sufficient to maintain centration of a conventional soft contact lens during normal blinking and eye movement.

In the lens of the present invention, however, where significant vertical translation is desirable to change from one optical zone to another, the forces of circumferential tension are reduced in specific quadrants by the unique configuration of the lens to the point where lid forces are effective to impart the desired vertical movement. In particular, the equiangular truncation of the two upper quadrants of the lens essentially eliminates circumferential tension over the area of truncation. The circumferential tension at the apex of the lens between the areas of truncation may be reduced by flattening the ocular edge surface of the lens as previously discussed in regard to surface 14' of FIG. 3. This flattening reduces the angular contact of the edge of the lens against the sclera as the lens is displaced vertically upward with a consequent reduction in resistance to that movement.

Figure 7:
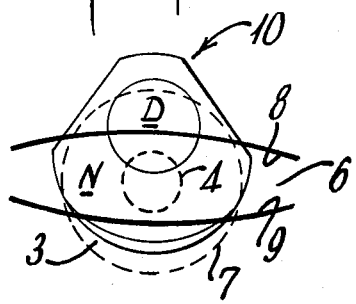
FIG. 7 is a plan front view of the eye and contact lens of FIG. 5.

As a result of the vertical translation of the lens during the blinking process as above described, the lens is positioned on the eye as illustrated in FIGS. 5 and 7 with a major portion of the pupil area covered by near vision optical zone N as best seen in FIG. 7. In general, clear vision and sharp focal perception are obtained when at least 65% of the pupil area is coincident with the desired optical zone.

To recenter the lens for distance vision, the wearer merely looks up to a forward gaze, relaxes the upper lid, and in most cases, the lens will drop to the desired position. If necessary, the wearer may blink once or twice while maintaining the forward gaze, but the resistance of the upper lid on the narrow apex portion of the lens is generally insufficient to hold the lens off center against the forces of gravity and circumferential tension around the lower portion of the lens which acts as a centering force. Likewise, normal blinking while maintaining a forward gaze will not cause translation or decentration of the lens since the predominant forces on the lens in the distance vision mode are those of circumferential tension around the lower portion of the lens.

As mentioned previously, proper vertical orientation of the lens is maintained due to the lowered center of gravity resulting from the equiangular truncation of the upper quadrants and, optionally, the base-down prism built into the lens. Stability against rotation is further assured by the action of the upper eye lid on the truncated portion of the lens since the final upward drag forces imparted by the lid during normal blinking are concentrated near the vertical axis of the lens.

The use of base-down prism to assure lens orientation has previously been used in connection with toric lenses which include a cylinder correction for astigmatism. Such lenses are conventionally provided with a beveled lower edge to reduce immediate edge thickness and improve the feel or comfort of the lens. Lenses in accordance with the present invention are likewise beveled, or more preferably, shaped as illustrated in FIGS. 8, 9, and 10.

Figures 8, 9, 10:
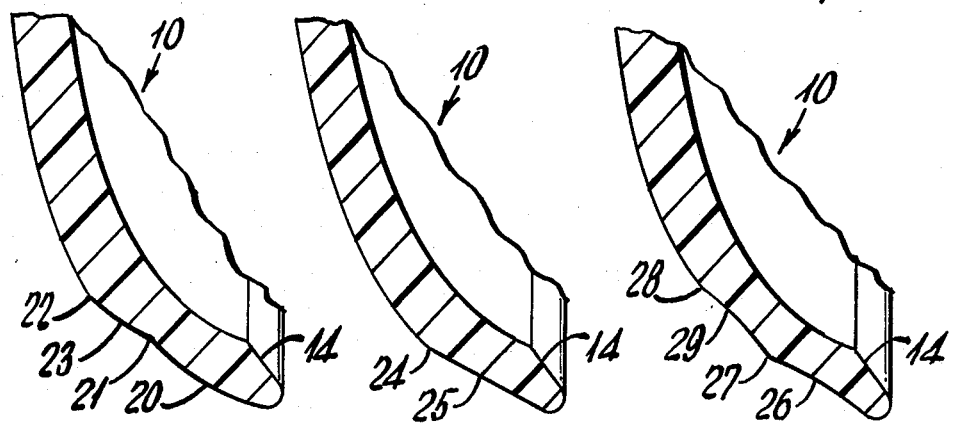
FIG. 8 is a partial view in cross section illustrating a preferred shaping of the lower edge of a high minus lens with prism.
FIG. 9 is a partial view in cross section illustrating a preferred shaping of the lower edge of a moderate minus lens with prism.
FIG. 10 is a partial view in cross section illustrating a preferred shaping of the lower edge of a plus lens with prism.

FIG. 8 illustrates the edge treatment of a high minus lens where portion 20 is provided with a slightly convex bevel to the desired lens thickness at 21, and the lens is lenticulated over section 23 to bridge the increasing lens thickness from 21 to 22.

FIG. 9 illustrates the edge treatment of a prism lens of moderate minus correction where portion 25 is beveled at the desired angle to the outer convex surface of the lens at 24.

FIG. 10 illustrates a plus correction lens where a concave bevel at 26 extends to the desired lens thickness at 27, and the lens is lenticulated from the outer surface at 28 to the beveled portion at 27.

Proper shaping of the lower edge is desirable not only for comfort but also to maximize the effect of the upper and lower lid forces in causing the lens to translate from distance to near vision as hereinbefore described.

As illustrated in FIGS. 5 and 7, the vertical translation of the lens to the near distance mode requires the apex portion of the lens to move onto the sclera a distance of from about 2 to 4 mm beyond its normal, centered resting position. Since the curvature of the sclera is less than that of the cornea, the apex portion of the lens tends to straighten from its normal curvature in the near distance mode as illustrated in FIG. 4. These differences in curvature create forces which act upon the lens during translation as a resistance to upward vertical movement. These forces can be reduced, and the translation of the lens more readily accomplished, by modifying the lens as illustrated in FIG. 11 and FIG. 12 to permit the apex of the lens to adapt to the lesser curvature of the sclera during translation.

Figure 11:
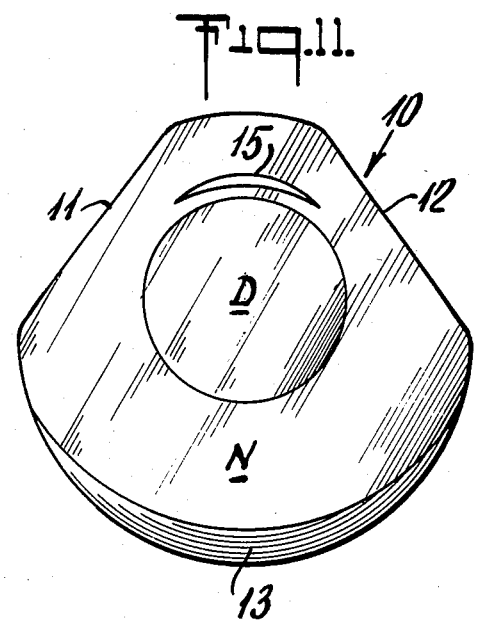
FIG. 11 is a front plan view of a bifocal lens in accordance with the present invention incorporating a horizontally disposed channel across the apical portion of the lens.
Figure 12:
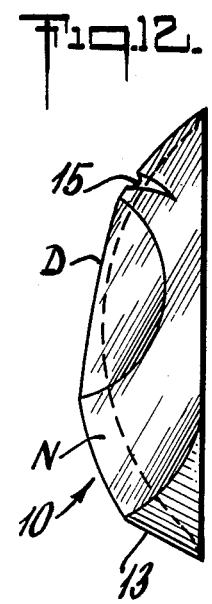
FIG. 12 is a side view of the lens of FIG. 11.

More specifically, with reference to FIGS. 11 and 12, lens 10 is provided with an area of weakness 15 in the form of a groove, channel or otherwise thinned section extending at least partially across the lens in the area of truncation between optical zone D and the apex of the lens. The thinned area is horizontally disposed across the lens and imparts flexibility to the apical portion of the lens by acting much like an integral hinge in the lens. Since the lens typically is required to move upward onto the sclera a distance of 2 to 4 mm during translation, the thinned area is preferably located at least b 2 mm below the apex of the lens.

The thinned area is preferably located on the outer surface of the lens as illustrated in FIGS. 11 and 12, but may alternatively be similarly located on the inner surface. The outer surface location provides an additional advantage in that the forces exerted by the upper eyelid during translation of the lens are increased as the eyelid moves across the thinned area, and will assist in causing the lens to translate to its near vision mode.

While the preceding description has dealt with one specific bifocal lens design, other multifocal designs are contemplated in accordance with the present invention as illustrated, for example, in FIGS. 13 through 20.

Figure 13:
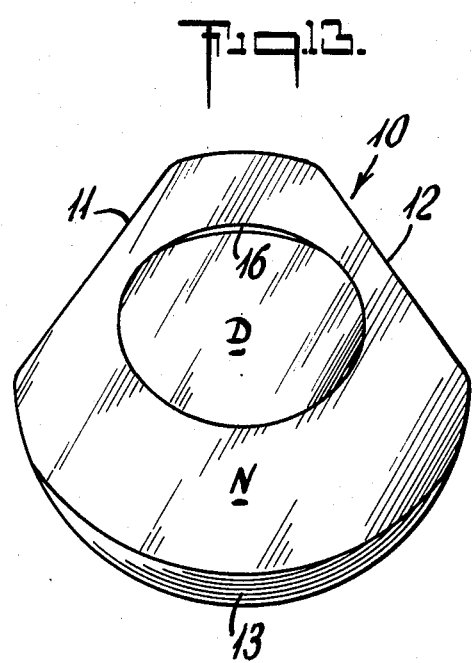
FIG. 13 is a front plan view of another embodiment of a bifocal lens in accordance with the present invention.
Figure 14:
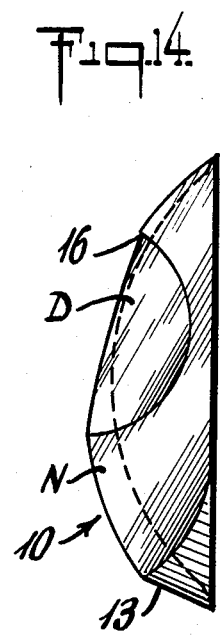
FIG. 14 is a side view of the lens of FIG. 13.

FIG. 13 and FIG. 14 illustrate a particular embodiment of a lens according to the present invention wherein the main body of the lens constitutes the near vision optical zone N, while the distance vision optical zone D is provided as a marginally truncated circular segment in the superior portion of the lens. In the illustrated embodiment, zone D is set into the convex surface of the lens as best seen in FIG. 14, creating a thinned channel effect at 16 across the superior edge portion of zone D which increases the flexibility of the apex of the lens as described above.

FIG. 15 and FIG. 16 illustrate another embodiment of a lens wherein the main body of the lens contains the distance vision optical zone D, while the near vision optical zone N is provided as a cresent-shaped segment in the form of a semicircle 30 having concave upper edge 31. The bifocal segment may be formed by incorporating a material having a different refractive index or by forming the lens to a different focal length in that area.

FIG. 17 and FIG. 18 illustrate an example of a trifocal lens according to the present invention wherein an optical zone I having an intermediate focal length is provided as a concentric band between the outer edge 33 of optical zone D and inner edge 32 of optical zone N. FIGS. 17 and 18 illustrate another example of a trifocal lens having intermediate vision optical zone I positioned as a band between optical zone D and optical zone N. Yet other designs for bifocal, trifocal, and higher multifocal lens may be utilized in connection with the lenses of the present invention as will be apparent to those skilled in the art, and such lenses are accordingly encompassed by the present invention.

Lenses of the present invention may be prepared by those skilled in the art utilizing conventional techniques for the fabrication of soft contact lenses. For example, the lenses may be lathe cut from a dehydrated lens blank or button of a hydrophilic polymer and subsequently hydrated to obtain the soft lens product. Alternatively, the lens may be molded in a dehydrated state or in the presence of water or solvent to obtain a soft product. Lens compositions may be of polyhydroxyethylmethacrylate (HEMA), copolymers of HEMA and N-vinylpyrrolidone (NVP), silicone or other material known to be useful in the fabrication of soft contact lenses.

We claim:

1. A multifocal contact lens comprising a lens body with a generally spherical, concave inner surface adapted to fit the cornea of a human eye, and a generally convex outer surface;

said lens body having a central, horizontal axis defining a superior portion of the lens and an inferior portion;

said lens body having a central vertical axis which, at the point of intersection with said horizontal axis, defines the geometric center of the lens;

the superior portion of said lens body being substantially equiangularly truncated from points on either side of the vertical axis at the apex of the lens to points on each respective side proximal the horizontal axis;

the inferior portion of said lens body being defined by an arc of substantially uniform radius from the geometric center of the lens over a major portion of the perimeter thereof;

said lens including a first optical zone having at lease a major portion thereof in the superior portion of the lens;

said lens including a second optical zone having at least a major portion thereof in the inferior portion of the lens;

the focal length of said second optical zone being shorter than that of said first optical zone.

2. A lens of claim 1 wherein the optical center of the concave inner surface is at the geometric center of the lens.

3. A lens of claim 1 wherein the optical center of said first optical zone is on the vertical axis in the superior portion of the lens.

4. A lens of claim 3 wherein the optical center of said first optical zone is spaced 0.5 to about 2.0 mm above the horizontal axis of the lens.

5. A lens of claim 1 wherein the optical center of said second optical zone is on the vertical axis in the inferior portion of the lens.

6. A lens of claim 1 wherein the optical center of said second optical zone is coincident with the optical center of said first optical zone.

7. A lens of claim 1 wherein said first optical zone defines a circular area extending into the inferior portion of the lens.

8. A lens of claim 1 wherein said second optical zone defines a crescent-shaped area predominantly in the vertically inferior portion of the lens.

9. A lens of claim 1 including a third optical zone positioned intermediate said first and said second optical zones and having a focal length intermediate that of said first and second optical zones.

10. A lens of claim 1 wherein the equiangular truncation of the superior portion of the lens extends from points spaced apart from about 2 mm to 8 mm at the apex of the lens.

11. A lens of claim 1 wherein the included angle of truncation is from about 45 degrees to 120 degrees.

12. A lens of claim 1 wherein the included angle of truncation is from about 65 degrees to 80 degrees.

13. A lens of claim 1 wherein said lens body includes base-down prism ballast.

14. A lens of claim 13 wherein the convex outer surface is beveled over a major portion of the inferior portion thereof to reduce edge thickness in the area of the prism ballast.

15. A lens of claim 1 wherein the concave inner surface is beveled around the perimeter thereof to provide an ocular edge surface having a greater radius of curvature than the generally spherical concave inner surface of the lens.

16. A lens of claim 15 wherein the superior portion of the lens intermediate the truncated portions is provided with an ocular edge surface having a greater width and radius of curvature than the corresponding ocular edge surface of the inferior portion of the lens.

17. A lens of claim 16 wherein the width of the ocular edge surface in the superior portion of the lens is from about 0.5 to 1.2 mm.

18. A lens of claim 1 having an outside diameter on the vertical axis of from about 15 mm.

19. A lens of claim 18 wherein the apical width of the lens between the areas of truncation is about 4 mm.

20. A lens of claim 19 wherein the included angle of truncation is about 65 to 80 degrees.

21. A lens of claim 20 wherein the first optical zone has an optical center located on the vertical axis in the superior portion of the lens.

22. A lens of claim 21 wherein the first optical zone has a diameter of about 7 mm and an optical center about 2 mm above the horizontal axis.

23. A lens of claim 1 including a area of weakness horizontally disposed in the superior portion of the lens at least 2 mm below the edge of the lens at the vertical axis.

24. A multifocal contact lens comprising a lens body with a generally spherical, concave inner surface adapted to fit the cornea of a human eye, and a generally convex outer surface;

said lens body having a central, horizontal axis defining a superior portion of the lens and an inferior portion;

said lens body having a central vertical axis and being symmetrical thereabout, the intersection of said vertical and horizontal axis defining the geometric center of the lens;

the superior portion of said lens body being substantially equiangularly truncated from points at the apex of the lens spaced apart from about 3 to 5 mm to points on each respective side of the lens proximal the horizontal axis, the included angle of truncation being from about 65 to 80 degrees;

the inferior portion of said lens body being defined by an arc of substantially uniform radius from the geometric center of the lens over a major portion of the perimeter thereof;

said lens including a first optical zone having at least a major portion thereof in the superior portion of the lens;

said lens including a second optical zone having at least a major portion thereof in the inferior portion of the lens;

the focal length of said second optical zone being shorter than that of said first optical zone.

25. A lens of claim 24 having an outside diameter on the vertical axis of from about 15 mm.

26. A lens of claim 25 wherein the first optical zone has an optical center located on the vertical axis in the superior portion of the lens.

27. A lens of claim 26 wherein the first optical zone has a diameter of about 7 mm and an optical center about 2 mm above the horizontal axis.

* * * * *